United States Patent
Jovers et al.

(10) Patent No.: US 11,958,330 B2
(45) Date of Patent: Apr. 16, 2024

(54) ASSEMBLY IN A COMPRESSED AIR SYSTEM OF A VEHICLE

(71) Applicant: ZF CV Systems Global GmbH, Bern (CH)

(72) Inventors: Ingo Jovers, Gehrden (DE); Johann Lucas, Sehnde (DE); Przemyslaw Zak, Wroclaw (PL)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 18/049,513

(22) Filed: Oct. 25, 2022

(65) Prior Publication Data

US 2023/0130275 A1 Apr. 27, 2023

(30) Foreign Application Priority Data

Oct. 25, 2021 (EP) ..................................... 21204461

(51) Int. Cl.
*B60G 17/052* (2006.01)

(52) U.S. Cl.
CPC .... *B60G 17/0523* (2013.01); *B60G 2202/152* (2013.01); *B60G 2500/203* (2013.01); *B60G 2500/204* (2013.01)

(58) Field of Classification Search
CPC .......... B60G 17/0523; B60G 2202/152; B60G 2500/203; B60G 2500/204
See application file for complete search history.

(56) References Cited

U.S. PATENT DOCUMENTS

| 9,205,719 B2 * | 12/2015 | Frank ................. | B60G 17/0521 |
| 11,685,216 B2 * | 6/2023 | Akcam .............. | B60G 17/0155 |
| | | | 280/124.16 |

FOREIGN PATENT DOCUMENTS

| DE | 3638849 A1 * | 5/1988 | ........... B62D 61/125 |
| DE | 39 15 826 C1 | 6/1990 | |
| DE | 43 27 763 A1 | 2/1995 | |
| DE | 4327763 A1 * | 2/1995 | ......... B60G 17/0155 |
| DE | 199 16 040 A1 | 10/2000 | |
| EP | 1149715 A1 * | 10/2001 | ......... B60G 17/0155 |

(Continued)

OTHER PUBLICATIONS

Extended European Search Report of the European Patent Office dated Apr. 19, 2022 for European application 21204461.4 on which this application is based.

*Primary Examiner* — Faye M Fleming
(74) *Attorney, Agent, or Firm* — Walter Ottesen, P.A.

(57) ABSTRACT

Assembly in a compressed air system of a vehicle provided with an air ride suspension, the assembly being configured to lift the vehicle body by filling at least one air spring, the solenoid valves being switchable in cooperation with an electronic control device, and the assembly including a pressure line for filling the air springs, and the pressure line including a first branch line connectable to the pressure line via a pilot-controlled solenoid valve for filling the air springs and including first supply pipes and pilot-controlled solenoid valves for each air spring as well as a second branch line for providing a control pressure which includes second supply pipes for the pilot-controlled solenoid valves, wherein the second branch line is connected to the pressure line via a check valve, the check valve providing a block position against venting or pressure drop in the second branch line.

11 Claims, 1 Drawing Sheet

(56) References Cited

FOREIGN PATENT DOCUMENTS

| | | | |
|---|---|---|---|
| EP | 2263892 A1 * | 12/2010 | ......... B60G 17/0525 |
| FR | 2 606 711 A1 | 5/1988 | |
| WO | 2004/030956 A1 | 4/2004 | |

* cited by examiner

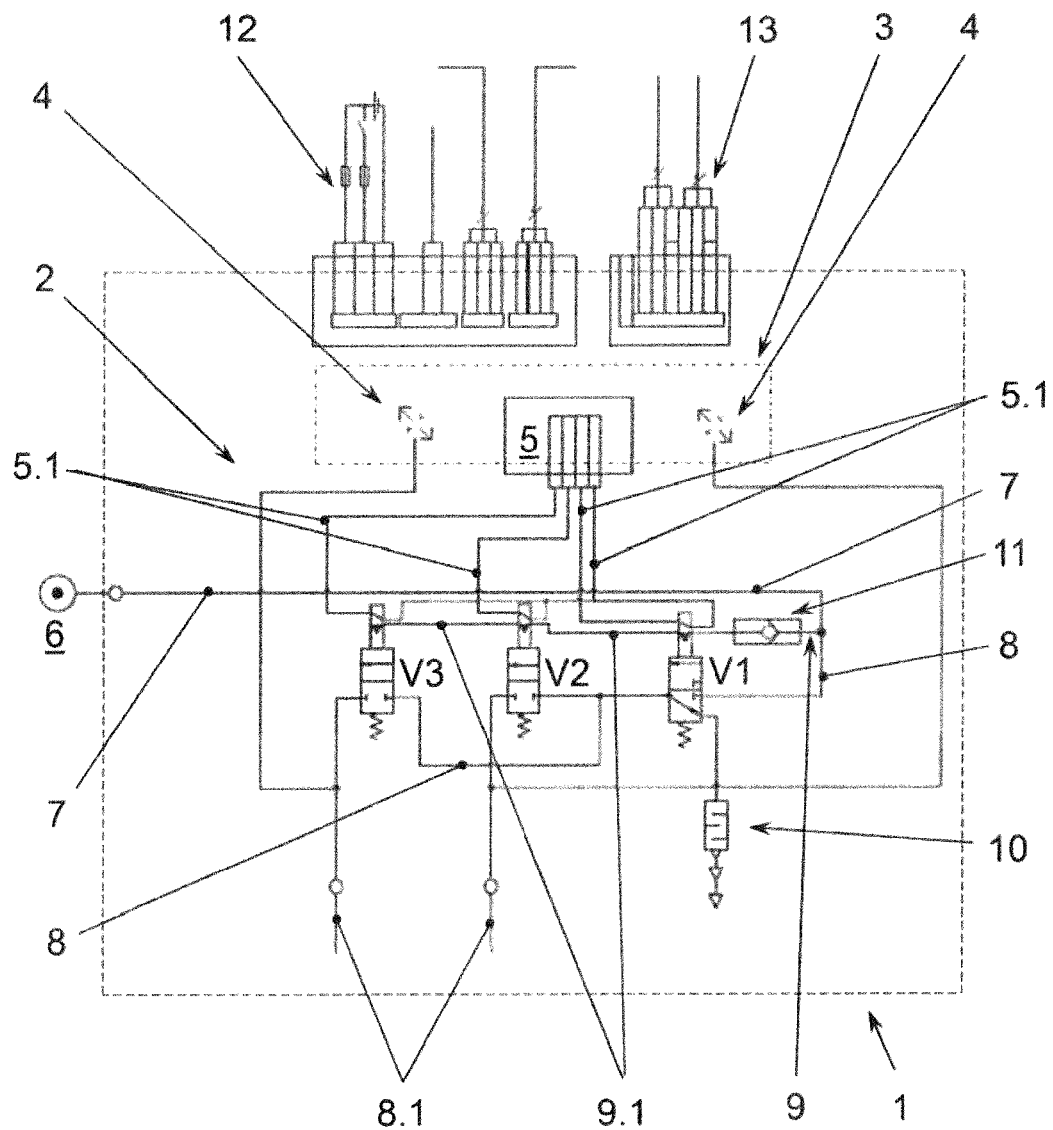

ASSEMBLY IN A COMPRESSED AIR SYSTEM OF A VEHICLE

CROSS REFERENCE TO RELATED APPLICATION

This application claims priority of European patent application no. 21204461.4, filed Oct. 25, 2021, the entire content of which is incorporated herein by reference.

TECHNICAL FIELD

The disclosure relates to an assembly in a compressed air system of a vehicle provided with an air ride suspension, the vehicle equipped with air springs, the assembly being configured to lift the vehicle body in relation to the road level by pressure-filling at least one air spring, that is, by filling at least one air spring with compressed air.

BACKGROUND

In vehicles in which essential means are operated with the aid of compressed air systems, it is important for the functionality of these systems operated by compressed air to be ensured in all operating states and also in case of potential air pressure fluctuations. Therefore, usually, a number of safety systems are provided which ensure functionality of the systems even in extreme cases. Particularly in commercial vehicles or busses in which not only the brake systems are operated by compressed air, but also air springs need to be supplied with compressed air, it is of course, on the one hand and first of all, important to keep up the brake function, however, on the other hand, also to ensure a safe suspension of the vehicle and to thereby avoid critical driving conditions.

This is particularly important if the vehicle has only one single air supply system including one compressor on board. Usually, pneumatic circuits for such systems in which brake circuits and air springs are supplied by only one pressure source have to be configured so that the brake systems have priority over other components operated by compressed air. Nevertheless, it is still equally important to keep the pneumatic circuits for operating a levelling system equipped with air springs in a condition where lifting or lowering of the vehicle remains possible and thus a safe driving operation remains ensured. Such a coordinated operation can be realized by way of a control/regulation via electric or pneumatic components, for example by way of control valves responding to pressure variations and/or electronic circuits providing for a corresponding logic with the aid of signals from pressure sensors.

However, it should be possible within a compressed air system to switch and perform all functions in all common operating states and situations, even in case of system-immanent air pressure fluctuations to be potentially expected, without activating, for example, a safety position or fail-safe position, if there is no necessity to do so. Insofar, therefore, it is required to ensure that, even in case of unusual switching operations or air consumption, no unnecessary blocking or deactivating of secondary devices is performed by the control/regulating system.

Such a process could, for example, occur when, in a leveling system, a sudden lifting of the vehicle body from a very low initial position is to be performed by sudden filling of the air springs, that is, when, for example, a rapid lifting is to be performed from a resting position of the vehicle body on a support or emergency spring (rapid lifting from a bumper).

Such rapid and powerful lifting requires a substantial volume of air and thereby, of course, generates a very high air consumption. The air volume which must be then filled into the bellows of the air springs to lift the chassis may, however, cause a pressure drop in the remaining system or in other line portions of the compressed air system. Since the pressure in the entire system is, of course, monitored by pressure sensors the detection of such a pressure drop may then lead to the pressure sensors generating signals for the control system. These signals could then cause reactions in the control logic which are potentially not required or even undesired, for example, could result in an undesired deactivation of specific system components or functions.

This will, in particular, become somewhat critical when, during such a sudden pressure drop induced by a lifting operation, those compressed air lines are affected which are provided to supply a pilot pressure for pilot-controlled solenoid valves. In case of such a pressure drop in such a pilot pressure line it may then—triggered by signals from corresponding pressure sensors—become desirable for the pilot-controlled solenoid valves to be switched by the control logic to a state that is per se safe and predetermined. This state, however, can no longer be safely reached in the absence of a sufficiently high pilot pressure. This may then, theoretically, lead to an indifferent position of the pilot-controlled solenoid valves. Such an indifferent position might, in the worst case, accelerate a further pressure drop.

Such an effect could, of course, be prevented by providing sufficient reservoirs having a high capacity in the compressed air system which, in such cases, compensate the pressure drop in the line portions, in particular the pilot pressure line portions and could prevent an indifferent position of the pilot-controlled solenoid valves occurring due to signal response of the control system. However, the integration of additional reservoirs is not only expensive, but also increases the dimensions of the overall system and its complexity. In smaller and more lightweight vehicles, the integration of additional reservoirs is therefore not a particularly preferred alternative for the designing engineer.

SUMMARY

Against this background it is an object of the present disclosure to provide a compressed air system for a vehicle having an air ride suspension and air springs so that a lifting of the vehicle body or of the vehicle frame in relation to the road level by rapidly filling the air springs can be accomplished in a simple manner without the mentioned switching problems occurring and without indifferent valve positions of pilot-controlled solenoid valves being produced due to a pressure drop in individual system components. Also, the use of additional components such as additional reservoirs is to be avoided, since such components substantially change the dimensions of the compressed air system or cause their configuration and production to become uneconomical.

This object is achieved by assemblies according to the disclosure.

An assembly according to the disclosure includes a pneumatic circuit provided with pilot-controlled solenoid valves in which the solenoid valves are switchable in cooperation with an electronic control device (ECU=Electronic Control Unit), as well as a pressure line connected to a compressed air supply provided in the vehicle for filling the air springs, wherein the pressure line includes branch lines, namely a) a first branch line for filling the air springs, the first branch line including first supply pipes for each air spring, as well as
b) a second branch line for providing a pilot pressure to the pilot-controlled solenoid valves, the second branch line including second supply pipes for the pilot-controlled solenoid valves, wherein, in the first branch line, the first supply pipes for each air spring respectively include a pilot-controlled solenoid valve having a gate and a block position, and wherein the first branch line is connectable to the pressure line via a pilot-controlled solenoid valve, and the solenoid valve has a first gate position for filling the air springs and a second gate position for venting the first branch line, and wherein the second branch line is connected to the pressure line via a check valve, the check valve providing a block position against venting or pressure drop in the second branch line.

With such a configuration of the assembly, when a sudden, rapid lifting of the chassis occurs by filling a large volume of air into the air springs and by connecting the first branch line to the pressure line via a pilot-controlled solenoid valve, the check valve in the second branch line prevents the pilot pressure line from losing pressure when filling the air springs. The solenoid valve in the first branch line occupies a first gate position for filling the air springs during the filling process.

Here, the assembly can preferably be configured as a module, that is, as a separate, replaceable component configured to be connectable to the remaining components of the compressed air system. In the special field of air ride development such kind of assembly may also be simply denoted as "levelling unit" or air suspension "valve module".

A further embodiment of the disclosure is based on the first supply pipes for each air spring including a pilot-controlled 2/2-way solenoid valve, respectively. In this way, a very simple configuration of pilot-controlled solenoid valves is made use of for filling the respective air spring. Where appropriate, venting the springs is also possible in this way, depending on the position of the other valves in the circuit.

In another embodiment of the disclosure, the first branch line is connectable to the pressure line via a pilot-controlled 3/2-way solenoid valve, a so-called "booster". This pilot-controlled solenoid valve is also a well-known and common valve produced in series which can be used for various gate positions and thus for various switching operations in a simple manner.

Another configuration is based on a common and central compressed air supply for supplying the air springs and a brake system being provided. Owing to the fact that the compressed air system includes the assembly formed according to the disclosure for lifting the vehicle body or the vehicle frame it is possible to operate even smaller systems without additional separate reservoirs and yet provide for all safety functions even when brakes and a level control system are operated by compressed air fed from the same source. This particularly also applies to such a configuration in which, advantageously, the central compressed air supply is provided for by only one single compressor in the vehicle.

Another embodiment is based on the check valve being configured so that the control pressure is at least 5 bar. With a check valve set to this pressure, a safe function of the pilot-controlled solenoid valves connected to the control line is guaranteed so that an indifferent position such as an intermediate position is avoided.

Another configuration is based on the first branch line being connectable to the atmosphere via a silencer means when the pilot-controlled 3/2-way solenoid valve is switched to the second gate position. With such a circuit, the air springs can then also be lowered, it being possible to perform the latter in a relatively soundless manner.

In a further embodiment of the disclosure, the pneumatic circuit and the electronic control device are integrated in the assembly/integral parts of the assembly and the electronic control device is connected to a vehicle control system via connecting components and/or a CAN-Bus. In this way, the magnets of the pilot-controlled valves can be centrally switched in cooperation with the electronic control device and be integrated in the remaining switching logic in a simple manner. That means the assembly is configured as a modular component mating the components of the compressed air system, preferably as a separate and replaceable component.

Advantageously, a compressed air system equipped with the assembly according to the disclosure is suitable for smaller commercial vehicles or for motorbuses reliant on space-saving and reduced-weight components.

BRIEF DESCRIPTION OF THE DRAWING

The invention will now be described with reference to the single FIGURE of the drawing (FIG. 1) which shows an assembly 1 according to the disclosure in a compressed air system. With such an assembly elevating or lifting of the vehicle body in relation to the road level can be performed by filling at least one air spring. FIG. 1 is executed in a strictly schematic manner only and with the aid of standard function or circuit symbols.

DESCRIPTION OF THE PREFERRED EMBODIMENTS

The assembly 1 includes a pneumatic circuit 2 provided with pilot-controlled solenoid valves V1, V2, and V3, the solenoid valves being switchable in cooperation with an electronic control device 3. The assembly 1 is illustrated in its outline including the essential associated functional elements by the dashed line here. Inside the dashed outline of the assembly 1, the electronic control device 3, the outline of which is illustrated by a dash-dotted line, can also be seen. Inside of this dash-dotted outline of the control device 3, inter alia, the functional elements for the pressure measuring sensors 4 and the plug-in members 5 for the electric connections 5.1 to the magnets of the pilot-controlled solenoid valves V1 to V3 can be found.

The pneumatic circuit of the assembly first of all includes a pressure line 7 connected to a compressed air supply 6 and providing for the compressed air volume for filling the air springs.

The pressure line 7 is divided into two branch lines, namely into a first branch line 8 for filling the air springs, which includes first supply pipes 8.1 for each air spring, as well as a second branch line 9 for providing a control pressure which includes second supply pipes 9.1 for the pilot-controlled solenoid valves V1 to V3. The air springs as such are not further shown here and are usually provided in a number corresponding to the suspended axes or wheels. Here, only supply pipes 8.1 for two air springs are shown for the sake of simplification. The number may, of course, be as desired.

The first supply pipes 8.1 for each air spring associated with the first branch line 8 respectively include a pilot-controlled solenoid valve V2, V3 which, depending on the switching of the solenoid valves, can occupy a gate or a block position, respectively. In this embodiment, the pilot-controlled solenoid valves V2 and V3 are 2/2-way solenoid valves as is also apparent from the circuit symbols. For completeness, it should be mentioned here that it is also possible to vent or lower the air springs through these valves. The latter then depends on the position of the pilot-controlled solenoid valve V1.

Here, the pilot-controlled solenoid valve V1 serves to connect the first branch line 8 to the pressure line 7. To this end, the solenoid valve V1 can occupy a first gate position for filling the air springs, and a second gate position for venting the first branch line 8 as is also apparent from the circuit symbols. In this embodiment, the pilot-controlled solenoid valve V1 is a 3/2-way solenoid valve. A venting of the first branch line 8 is performed directly into the atmosphere via a silencer means 10 here.

According to the disclosure, the second branch line 9 is connected to the pressure line 7 via a check valve 11. In its block position, the check valve prevents venting of the second branch line 9 or a pressure drop in the second branch line 9 so that the pressure in the second branch line, namely in the control pressure line, cannot drop below a minimum pressure of 5 bar.

In the upper part of FIG. 1, two plug-in members or connections 12 and 13 can be seen with the aid of which the assembly or its electronic control device can be connected to a vehicle control system not shown here and to another sensor system of the vehicle or the air ride suspension.

It is understood that the foregoing description is that of the preferred embodiments of the invention and that various changes and modifications may be made thereto without departing from the spirit and scope of the invention as defined in the appended claims.

LIST OF REFERENCE NUMERALS (PART OF THE SPECIFICATION)

1 Assembly in a compressed air system of a vehicle provided with an air ride suspension
2 Pneumatic circuit
3 Electronic control device
4 Pressure sensor
5 Plug-in member
5.1 Electric connection
6 Compressed air supply
7 Pressure line
8 First branch line of the pressure line
8.1 First supply pipe, supply pipe for the air spring
9 Second branch line of the pressure line
9.1 Second supply pipe, supply pipe for the pilot pressure
10 Silencer means
11 Check valve
12 Plug-in members and connections to the vehicle control system
13 Plug-in members and connections to the sensor system
V1 Pilot-controlled 3/2-way solenoid valve
V2 Pilot-controlled 2/2-way solenoid valve
V3 Pilot-controlled 2/2-way solenoid valve

What is claimed is:

1. An assembly in a compressed-air system of a vehicle provided with an air ride suspension, the vehicle equipped with a plurality of air springs, the assembly being configured to lift a vehicle body of the vehicle in relation to a road level by pressure-filling at least one of the plurality of air springs, the assembly comprising:
   a pneumatic circuit having a plurality of pilot-controlled solenoid valves;
   said plurality of solenoid valves being switchable in cooperation with an electronic control device;
   a pressure line for filling the air springs, said pressure line being connected to a compressed air supply;
   said pressure line including a first branch line for filling the air springs, said first branch line including first supply pipes for each of the plurality of air springs;
   said pressure line including a second branch line for providing a pilot pressure to said plurality of pilot-controlled solenoid valves, said second branch line including second supply pipes for said pilot-controlled solenoid valves;
   said plurality of pilot-controlled solenoid valves including first pilot-controlled solenoid valves;
   wherein, in said first branch line, said first supply pipes include at least one of said first pilot-controlled solenoid valve for each of the plurality of air springs, wherein said first pilot-controlled solenoid valves each have a gate and a block position;
   said plurality of pilot-controlled solenoid valves including a second pilot-controlled solenoid valve configured as a pneumatic pressure-controlled solenoid valve;
   said first branch line being configured to connect to said pressure line via said second pilot-controlled solenoid valve, said second pilot-controlled solenoid valve having a first gate position for filling the plurality of air springs and a second gate position for venting said first branch line; and,
   wherein only said second branch line is connected to said pressure line via a check valve, said check valve having a block position against venting or pressure drop in said second branch line.

2. The assembly of claim 1, wherein said first pilot-controlled solenoid valves are pilot-controlled 2/2-way solenoid valves.

3. The assembly of claim 1, wherein said second pilot-controlled valve is a pilot-controlled 3/2-way solenoid valve.

4. The assembly of claim 1, wherein a central compressed air supply is provided for supplying the plurality of air springs of the air ride suspension and an air brake system.

5. The assembly of claim 4, wherein the central compressed air supply is provided by a compressor in the vehicle.

6. An assembly in a compressed-air system of a vehicle provided with an air ride suspension, the vehicle equipped with a plurality of air springs, the assembly being configured to lift a vehicle body of the vehicle in relation to a road level by pressure-filling at least one of the plurality of air springs, the assembly comprising:
   a pneumatic circuit having a plurality of pilot-controlled solenoid valves;
   said plurality of solenoid valves being switchable in cooperation with an electronic control device;
   a pressure line for filling the air springs, said pressure line being connected to a compressed air supply;
   said pressure line including a first branch line for filling the air springs, said first branch line including first supply pipes for each of the plurality of air springs;
   said pressure line including a second branch line for providing a pilot pressure to said plurality of pilot-controlled solenoid valves, said second branch line including second supply pipes for said pilot-controlled solenoid valves;

said plurality of pilot-controlled solenoid valves including first pilot-controlled solenoid valves;

wherein, in said first branch line, said first supply pipes include at least one of said first pilot-controlled solenoid valve for each of the plurality of air springs, wherein said first pilot-controlled solenoid valves each have a gate and a block position;

said plurality of pilot-controlled solenoid valves including a second pilot-controlled solenoid valve configured as a pneumatic pressure-controlled solenoid valve;

said first branch line being configured to connect to said pressure line via said second pilot-controlled solenoid valve, said second pilot-controlled solenoid valve having a first gate position for filling the plurality of air springs and a second gate position for venting said first branch line;

said second branch line being connected to said pressure line via a check valve, said check valve having a block position against venting or pressure drop in said second branch line; and, wherein said check valve is configured such that the pilot pressure is at least 5 bar.

7. An assembly in a compressed-air system of a vehicle provided with an air ride suspension, the vehicle equipped with a plurality of air springs, the assembly being configured to lift a vehicle body of the vehicle in relation to a road level by pressure-filling at least one of the plurality of air springs, the assembly comprising:

a pneumatic circuit having a plurality of pilot-controlled solenoid valves;

said plurality of solenoid valves being switchable in cooperation with an electronic control device;

a pressure line for filling the air springs, said pressure line being connected to a compressed air supply;

said pressure line including a first branch line for filling the air springs, said first branch line including first supply pipes for each of the plurality of air springs;

said pressure line including a second branch line for providing a pilot pressure to said plurality of pilot-controlled solenoid valves, said second branch line including second supply pipes for said pilot-controlled solenoid valves;

said plurality of pilot-controlled solenoid valves including first pilot-controlled solenoid valves;

wherein, in said first branch line, said first supply pipes include at least one of said first pilot-controlled solenoid valve for each of the plurality of air springs, wherein said first pilot-controlled solenoid valves each have a gate and a block position;

said plurality of pilot-controlled solenoid valves including a second pilot-controlled solenoid valve configured as a pneumatic pressure-controlled solenoid valve;

said first branch line being configured to connect to said pressure line via said second pilot-controlled solenoid valve, said second pilot-controlled solenoid valve having a first gate position for filling the plurality of air springs and a second gate position for venting said first branch line;

said second branch line being connected to said pressure line via a check valve, said check valve having a block position against venting or pressure drop in said second branch line;

said second pilot-controlled valve is a pilot-controlled 3/2-way solenoid valve; and, wherein said first branch line is configured to connect to an atmosphere via a silencer when said pilot-controlled 3/2-way solenoid valve is switched to said second gate position.

8. An assembly in a compressed-air system of a vehicle provided with an air ride suspension, the vehicle equipped with a plurality of air springs, the assembly being configured to lift a vehicle body of the vehicle in relation to a road level by pressure-filling at least one of the plurality of air springs, the assembly comprising:

a pneumatic circuit having a plurality of pilot-controlled solenoid valves;

said plurality of solenoid valves being switchable in cooperation with an electronic control device;

a pressure line for filling the air springs, said pressure line being connected to a compressed air supply;

said pressure line including a first branch line for filling the air springs, said first branch line including first supply pipes for each of the plurality of air springs;

said pressure line including a second branch line for providing a pilot pressure to said plurality of pilot-controlled solenoid valves, said second branch line including second supply pipes for said pilot-controlled solenoid valves;

said plurality of pilot-controlled solenoid valves including first pilot-controlled solenoid valves;

wherein, in said first branch line, said first supply pipes include at least one of said first pilot-controlled solenoid valve for each of the plurality of air springs, wherein said first pilot-controlled solenoid valves each have a gate and a block position;

said plurality of pilot-controlled solenoid valves including a second pilot-controlled solenoid valve configured as a pneumatic pressure-controlled solenoid valve;

said first branch line being configured to connect to said pressure line via said second pilot-controlled solenoid valve, said second pilot-controlled solenoid valve having a first gate position for filling the plurality of air springs and a second gate position for venting said first branch line;

said second branch line being connected to said pressure line via a check valve, said check valve having a block position against venting or pressure drop in said second branch line; and, wherein said pneumatic circuit and said electronic control device are integrated in the assembly and said electronic control device is connected to a vehicle control system via at least one of connecting components and a CAN bus.

9. A compressed air system of an air-suspended vehicle having a vehicle body and an air ride suspension, the compressed air system comprising:

a plurality of air springs;

a lift assembly configured to lift the vehicle body in relation to a road level by filling at least one of said plurality of air springs;

said lift assembly including a pneumatic circuit including a plurality of pilot-controlled solenoid valves;

said plurality of solenoid valves being switchable in cooperation with an electronic control device;

a compressed air supply;

said lift assembly including a pressure line for filling said plurality of air springs, said pressure line being connected to said compressed air supply;

said pressure line including a first branch line for filling said plurality of air springs, said first branch line including first supply pipes for each of said plurality of air springs;

said pressure line including a second branch line for providing a pilot pressure to said plurality of pilot-controlled solenoid valves, said second branch line including second supply pipes for said plurality of pilot-controlled solenoid valves;

said plurality of pilot-controlled solenoid valves including first pilot-controlled solenoid valves;

wherein, in said first branch line, said first supply pipes include at least one of said first pilot-controlled solenoid valve for each of said plurality of air springs, wherein said first pilot-controlled solenoid valves each have a gate and a block position;

said plurality of pilot-controlled solenoid valves including a second pilot-controlled solenoid valve;

said first branch line being configured to connect to said pressure line via said second pilot-controlled solenoid valve, said second pilot-controlled solenoid valve having a first gate position for filling said plurality of air springs and a second gate position for venting said first branch line;

wherein only said second branch line is connected to said pressure line via a check valve, said check valve having a block position against venting or pressure drop in said second branch line; and, said lift assembly being a modular component configured to mate with other components of the compressed air system.

10. The compressed air system of claim 9, wherein said lift assembly is a separate and replaceable component of the compressed air system.

11. An air-suspended commercial vehicle or motorbus comprising the compressed air system of claim 9.

* * * * *